United States Patent [19]
Wood et al.

[11] Patent Number: 5,601,225
[45] Date of Patent: * Feb. 11, 1997

[54] WELDING APPARATUS

[75] Inventors: J. W. Wood; Robert J. Lowery; Robert L. Knipschield, all of Charlotte, N.C.

[73] Assignee: J. A. Jones Applied Research Company, Charlotte, N.C.

[*] Notice: The term of this patent shall not extend beyond the expiration date of Pat. No. 5,435,478.

[21] Appl. No.: 506,806

[22] Filed: Jul. 25, 1995

Related U.S. Application Data

[63] Continuation of Ser. No. 740,315, Aug. 5, 1991, Pat. No. 5,435,478.

[51] Int. Cl.$^6$ .......................... B23K 37/053; B23K 9/02
[52] U.S. Cl. .......................... 228/9; 228/44.5; 228/49.3; 228/105
[58] Field of Search .................. 228/105, 44.5, 228/49.3, 9; 269/43, 48.1, 11, 15

[56] References Cited

U.S. PATENT DOCUMENTS

| | | | |
|---|---|---|---|
| 3,009,049 | 11/1961 | Stanley | 219/60 R |
| 3,194,466 | 7/1965 | Davis | 228/42 |
| 3,292,254 | 12/1966 | Sloan | 219/60 R |
| 3,424,887 | 1/1969 | Fehlman | 219/60 R |
| 3,764,056 | 10/1973 | Edwards et al. | 219/60 |
| 4,649,426 | 3/1987 | Bolstad | 219/130.01 |
| 5,398,862 | 3/1995 | Aleman | 228/49.3 |
| 5,435,478 | 7/1995 | Wood et al. | 228/42 |

*Primary Examiner*—P. Austin Bradley
*Assistant Examiner*—Jeffrey T. Knapp
*Attorney, Agent, or Firm*—W. Thad Adams, III P.A.

[57] ABSTRACT

An apparatus for aiding in welding a pipe structure is provided. The apparatus includes first and second expandable spaced apart seals adapted to be positioned in the pipe structure and on opposed sides of a region subjected to a welding process. Each of the spaced apart seals has a circular exterior surface selectively expandable to contact and form a seal with an interior surface of the piping structure, and a circular inner surface. A light-transmitting tubular shield support extends between the first and second seals and mates with the circular inner surfaces to position the first and second seals in spaced relationship with each other. An optical device has a selectable field of view supported within the interior of the tubular support, and is rotatable about the major axis of the tubular support for producing an image of the portion of the inner surface of the piping structure that is within the field of view of the optical device. A pump supplies a liquid to the region between the exterior surface of the tubular support and the interior of the pipe structure.

7 Claims, 4 Drawing Sheets

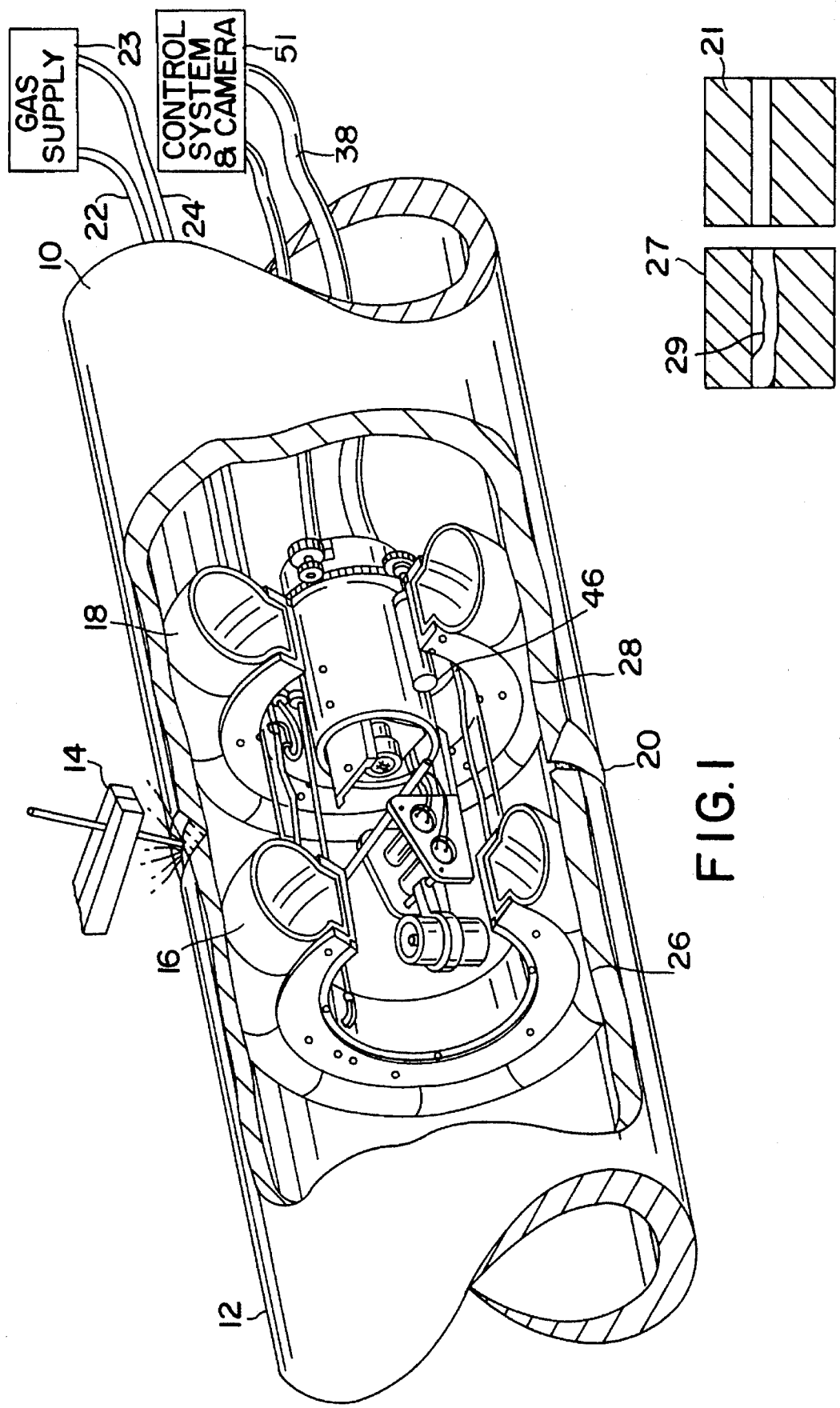

WELDING APPARATUS

FIELD OF THE INVENTION

This is a continuation application of U.S. Ser. No. 07/740,315, filed Aug. 5, 1991 now U.S. Pat. No. 5,435,478. The invention relates to welding methods and apparatus and more particularly to apparatus and methods for establishing a predetermined atmosphere in the weld zone and for observing the weld zone during and after the weld is complete.

DESCRIPTION OF THE PRIOR ART

Extensive apparatus and methods are available in the prior art to aid in performing and inspecting welds associated with pipe structures. Additionally, it is typical in critical applications to provide special purpose equipment for controlling the atmosphere in the weld zone. The invention which is the subject matter of this patent application was developed as a tool to be used in constructing and/or repairing pipe structures associated with nuclear power plants.

Most pipe welding applications are related to either new construction or repairs. Forming joints by welding in new construction requires that the weld zone be protected. In making a repair it is also sometimes desirable to block and/or drain water which may accumulate at or near the weld zone from other parts of the system being repaired. Generally, all of these applications require that equipment and methods be provided for controlling the atmosphere on the vicinity of the weld zone and for monitoring the welding process to detect defects. Defects not detected during the welding process are located by post-weld inspections such as conventional x-ray examinations. In other applications it is also desirable to utilize a cooling fluid, such as water to cool the welding zone to control the quality of the weld.

Typical prior art multiple pass pipe welding applications used automated pipe welding equipment with the final weld being inspected by x-ray examination. Practical considerations required the weld to be completed before the inspection could be done even though a large portion of defects occurred during the first welding pass. Thus, essentially no technique was available for monitoring the welding process by visually observing the interior surface of the pipe structure. It has long been recognized that detection of weld faults in the first pass before the weld was completed would save thousands of dollars in the correction of such defects.

SUMMARY OF THE INVENTION

The invention provides multi-purpose apparatus for welding pipe structures. In a typical application abutting ends first and second sections of pipe are joined and/or repaired by welding.

More specifically, the apparatus comprising the invention provides means for observing the interior of the pipe structure during a welding cycle, observing the interior of the pipe before a welding operation, observing the interior of the pipe structure after a welding operation begins, producing permanent records of the foregoing observations and establishing a predetermined atmosphere in the welding zone.

The required observations are accomplished using a TV camera mounted in the interior of the pipe structure. Two spaced apart seals also permit the injection of a predetermined medium into the interior of the pipe structure in an area adjacent the weld zone to establish the desired atmosphere in the weld zone and isolate the weld zone from other portions of the pipe structure and/or the apparatus associated therewith.

It has been found that visually observing the weld during the welding process permits incomplete consumption of the insert ring to be detected during the first welding pass. Recorded visual images of the weld zone during the welding process aids in interpreting later results of x-ray examination of completed joints.

Specifically, real time visual observations permit incomplete consumption of the insert ring to be detected during the first welding pass. This permits corrective action to be taken before the welding process is completed. During conventional x-ray examination of completed joints formed by welding it is often difficult to distinguish between variation in thickness of the weld and incomplete consumption of the insert ring. Permanent video records of the weld zone during the welding process makes such a distinction routine. Specifically, conventional x-ray examination does not permit a discrimination between variations in thickness and incomplete insert ring consumption. Records of visual observations permit variations in thickness due to roughness of the surface to be distinguished from incomplete insert ring consumption.

Other embodiments of the invention provide means for establishing preselected atmosphere, including non-oxidizing or cooling atmospheres in the weld zone. Additionally, means may be provided for draining liquid which accumulates in the pipe structure in a region adjacent the weld zone.

DESCRIPTION OF THE DRAWINGS

FIG. 1 is an isometric drawing illustrating the preferred embodiment of the invention.

FIG. 2 is a fragmentary drawing illustrating incomplete consumption of the insert ring.

DETAILED DESCRIPTION

Figure 3:
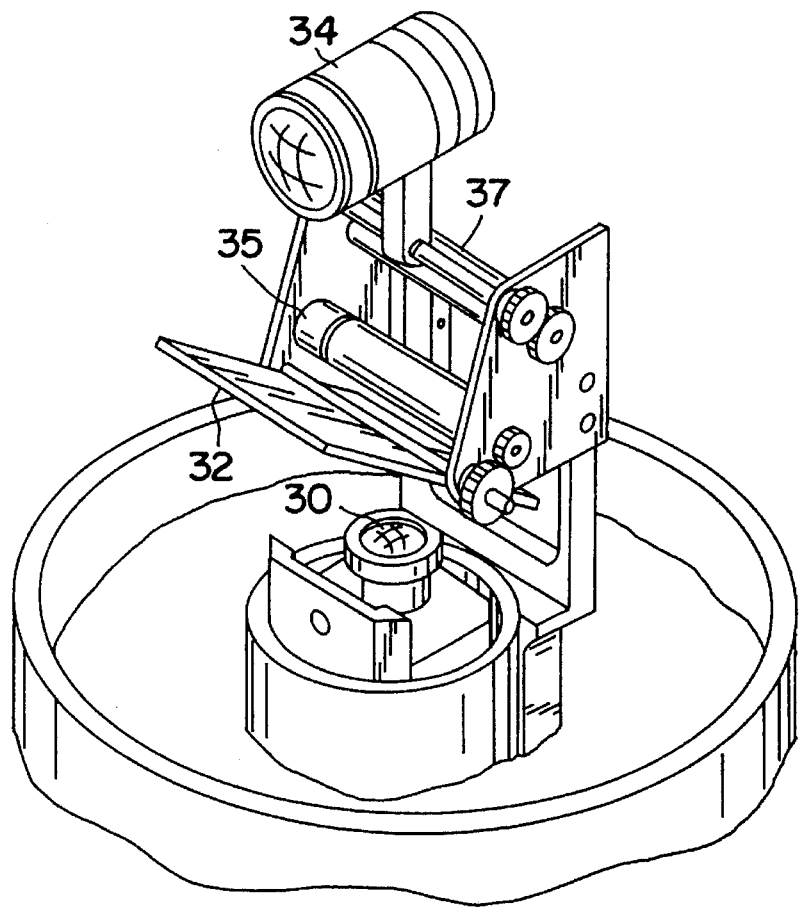
FIG. 3 is a drawing illustrating the reflection mirror, the camera, and the light used in observing the interior of the pipe structure.

The preferred and the development model of the apparatus comprising the invention is illustrated in isometric view in FIG. 1. Functionally, the apparatus provides a method and apparatus for isolation of the weld zone from the remainder of the pipe structure and other apparatus associated therewith, for establishing a predetermined atmosphere in the weld zone and for observing the weld zone during the welding cycle. Modifications permit the apparatus to be used to drain liquid from a region of the pipe structure adjacent the weld zone.

More specifically, the apparatus comprising the invention, as illustrated and described with respect of a preferred embodiment, is utilized to establish a predetermined (preferably a non-oxidizing gaseous) environment in the weld zone which includes the interior of first and second beveled abutting ends 10 and 12 of two sections of a pipe spaced apart by an insert ring 20, which are to be joined using an arc welding head 14. As is conventional, the insert ring 20 is positioned between the two ends 10 and 12, to be joined to provide fill material to assure that the ends 10 and 12 fuse to form one defect free structure. During the first welding pass a defect free weld requires that the insert ring 20 completely melt and fuse with the adjoining metal. This is normally referred to as "complete insert ring consumption". On subsequent passes filler material is added, using conventional techniques to complete the weld.

FIG. 2 illustrates two fragmentary sections of a typical weld joining abutting sections of pipe using an insert using welding technique. Complete insert ring consumption is illustrated in fragmentary section 21 by the weld joint which has a textured surface with generally uneven edges. By contrast fragmentary section 27 illustrates incomplete insert ring consumption along a region 29 where the straight edge of an unconsumed portion of the insert ring 20 is visible.

Apparatus comprising the invention can be used to detect defects due to incomplete insert ring consumption during the first welding pass, as more specifically discussed below. Such visual images may also be recorded and used as an aid in interpreting x-ray examination results of the finished weld, as discussed below.

The apparatus comprising the preferred embodiment of the invention includes means for viewing the weld zone from the interior of the pipe structure as the welded joint is formed. This capability is useful in helping the operator improve the quality of the welding process and reduce cost. The system is particularly advantageous in critical applications such as the welding of pipes in nuclear reactors. In such applications imperfections in the weld, particularly near the interior surface of the pipe due to incomplete insert ring consumption are unacceptable requiring the entire weld to be redone. However, by utilizing the apparatus comprising the disclosed and claimed invention as described below, such imperfections are usually detected during the first weld pass and repaired prior to completion of the weld. For example, in typical application, the ability to detect and correct defects due to incomplete insert ring consumption during the first weld pass can save hundreds of thousands of dollars. Detection of defects during a later portion of the welding process may result in a smaller, however significant saving.

In other applications, it is often helpful the establish a cooling atmosphere, such as water, in the interior of the piping structure. Additionally, it may be desirable the circulate the water to provide a predetermine temperature. The apparatus comprising the invention can be utilized to perform this function by changing the medium used to establish the predetermined atmosphere from a gas to water.

These features synergistically interact to reduce cost and improve the quality of the welds, as subsequently discussed. That is, the above described features may be used individually on in combination, depending of the requirements of the welding process to be performed.

The welding apparatus comprising the invention includes first and second circular expandable seal members 16 and 18. In operation, these sealing members are positioned on either side of the weld zone and expanded to contact the interior of the pipe structure to produce seals therewith which isolates the weld zone from the remainder of the pipe structure. In the experimental embodiment of the invention, the sealing members 16 and 18 were inflatable resilient tubular members similar to tubes for small bicycle tires.

In use, the apparatus comprising the invention is positioned in the desired location in the interior of the pipe structure and the inflatable seal members 16 and 18 inflated by supplying a suitable gas (for example, air) through input tubes 22 and 24. Each of the sealing members, 16 and 18, are supported on rims 26 and 28 and when inflated form seals therewith. A tubular member positioned concentric with the axis of rotation of the rims, 26 and 28, supports the rims in a fixed spaced relationship to each other. The rims cooperate with the seals, 16 and 18, to isolate the weld zone from the remainder of the pipe structure thereby permitting a preselected atmosphere to be established in the region between the seals 16 and 18, as discussed below.

After the seal members 16 and 18 have been inflated a pumpable medium, preferably an inert gas, is supplied to the region between the seals, 16 and 18 and exterior to the tubular member, to establish the desired atmosphere in the interior of the pipe structure comprising sections 10 and 12 of pipe and adjacent the weld zone.

Figure 4:
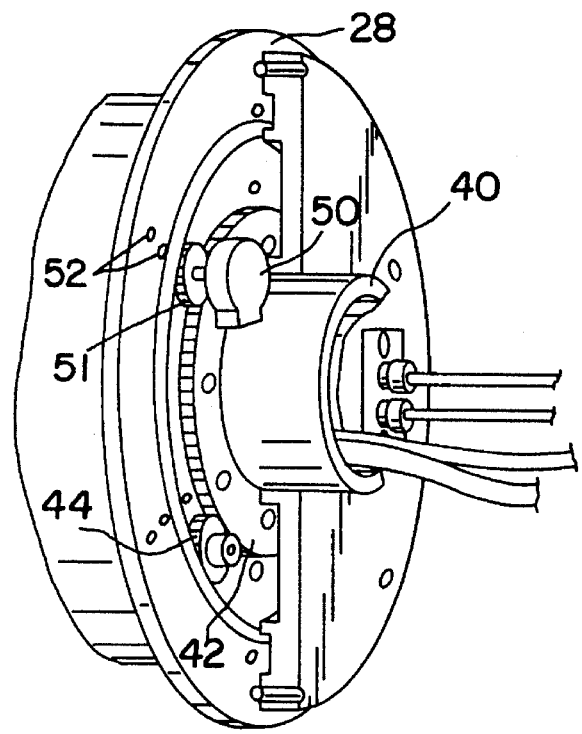
FIG. 4 is a partial drawing illustrating the mechanism utilized to rotate the camera and the apparatus associated with usual observations of the interior of the pipe structure.

One of the rims included a hub member, fragmentary illustrated in FIGS. 3 and 4, for supporting a TV camera 30 and other viewing apparatus permitting the operator to view the interior of the pipe sections 10 and 20 as well as the weld zone. Included in the apparatus supported by the hub is a mirror 32 which is selectively rotated by a small electric motor 35 permitting the area viewed by the TV camera 30 to be adjusted longitudinally across the interior surface of the sections of pipes 10 and 12. Additionally, a light 34 rotated by an electric motor 37 is included for selectively illuminating the interior of the pipe.

During welding the hot metal in the weld zone produces sufficient radiation to permit this region to be visually observed using a conventional TV camera. The light 34 permits observations to be made in the absence of or subsequent to the welding process.

The hub and the end plate supporting the hub is further illustrated in FIG. 4. More specifically, the hub includes a central portion 40 mounted concentrically with respect to the rim 28. A gear 42 is affixed to the central portion 40 and is rotated by a gear 44 attached to the shaft of an electric motor 46 (FIG. 1). Also a position sensor 50 is driven by the gear 42. Signals from the sensor 50 are coupled to a control system 51, permitting the viewing apparatus to be rotated to the desired position. This permits the mirror to be aligned to coincide with the starting point of the weld and follow the weld as it progresses around the pipe.

Figure 5:
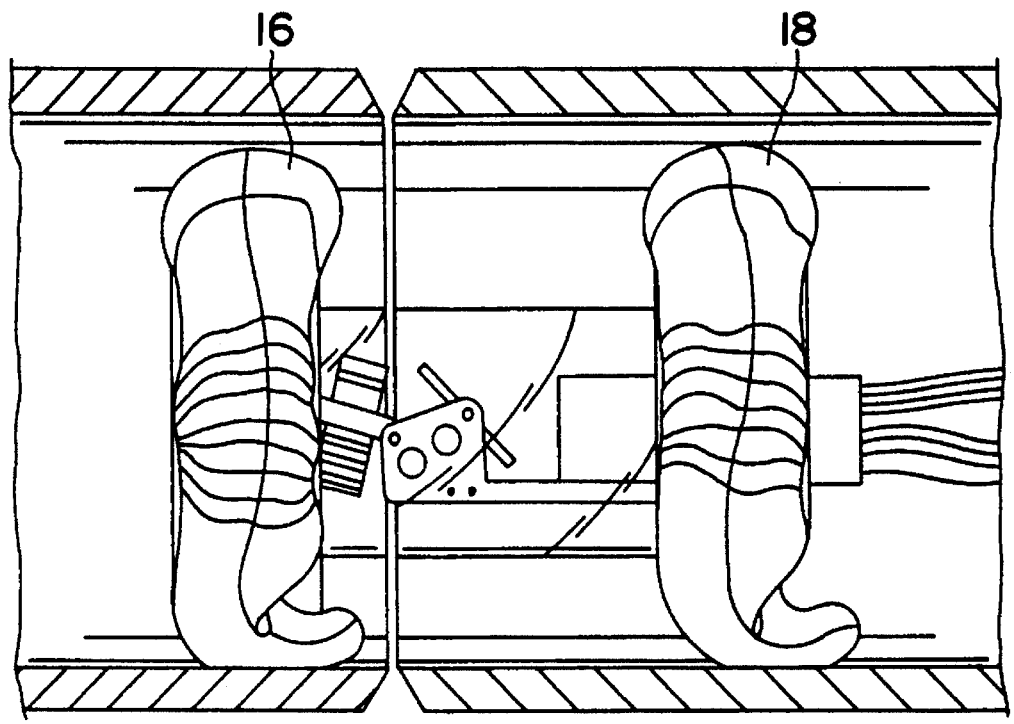
FIG. 5 is a cross-sectional drawing illustrating the insertion of the apparatus into a pipe structure.
Figure 6:
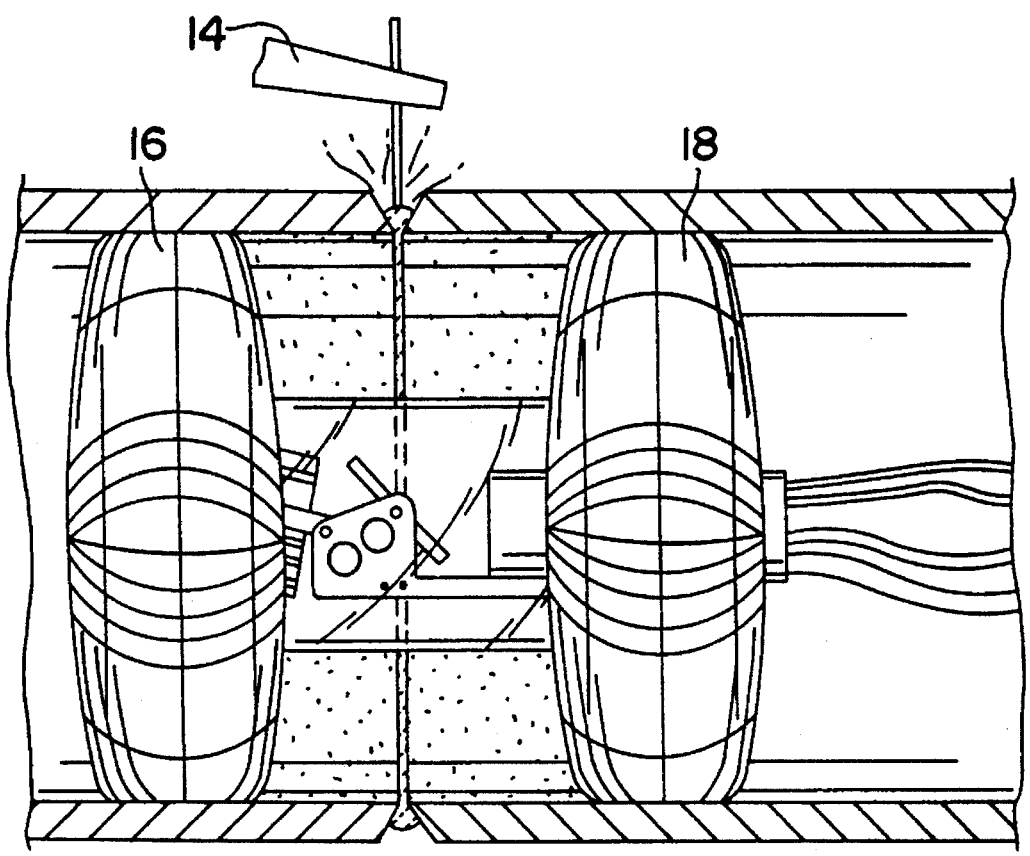
FIG. 6 is a drawing illustrating the operation of the apparatus to form a seal isolating the weld zone from the remainder of the pipe structure.

FIG. 5 illustrates the insertion of the apparatus comprising the invention into a typical pipe structure. Very simply, the tubular seal members 16 and 18 are deflated and the apparatus comprising the invention is pushed into the desired position using any convenient technique. Once positioned, the tubular seal members 16 and 18 are inflated as illustrated in FIG. 6 secure the apparatus in the desired position.

A predetermined atmosphere is established in the weld zone by pumping the desired medium into the region between the seals via a suitable tube (FIG. 1) For example, an inert gas from a gas supply 23 mixes with the preexisting atmosphere with the mixture escaping through the junction of the sealing ring 20 and the pipe ends as well as through holes 52 in the hub. As the flow of inert gas continues, the concentration of the inert gas in the weld zone increases. The welding cycle is initiated when the concentration of the inert gas reaches the desired value. Then the concentration of the inert gas in the weld zone is to protect the joint during welding.

A control system controls the position of the TV camera, light and mirror to permit the desired observations to be made. Additionally a conventional TV recording of the weld zone during the welding cycle is made. If during the first pass incomplete consumption of the insert ring is observed, the first welding pass can is repeated to correct the defect. After the weld is complete, the TV image can be used as an aid in determining if an abnormality in the x-ray examination records represents a defect in the weld or an uneven surface on the interior of the pipe structure.

Although the invention has been described above with respect to the preferred embodiment, many variations in the invention are possible.

Figure 7:
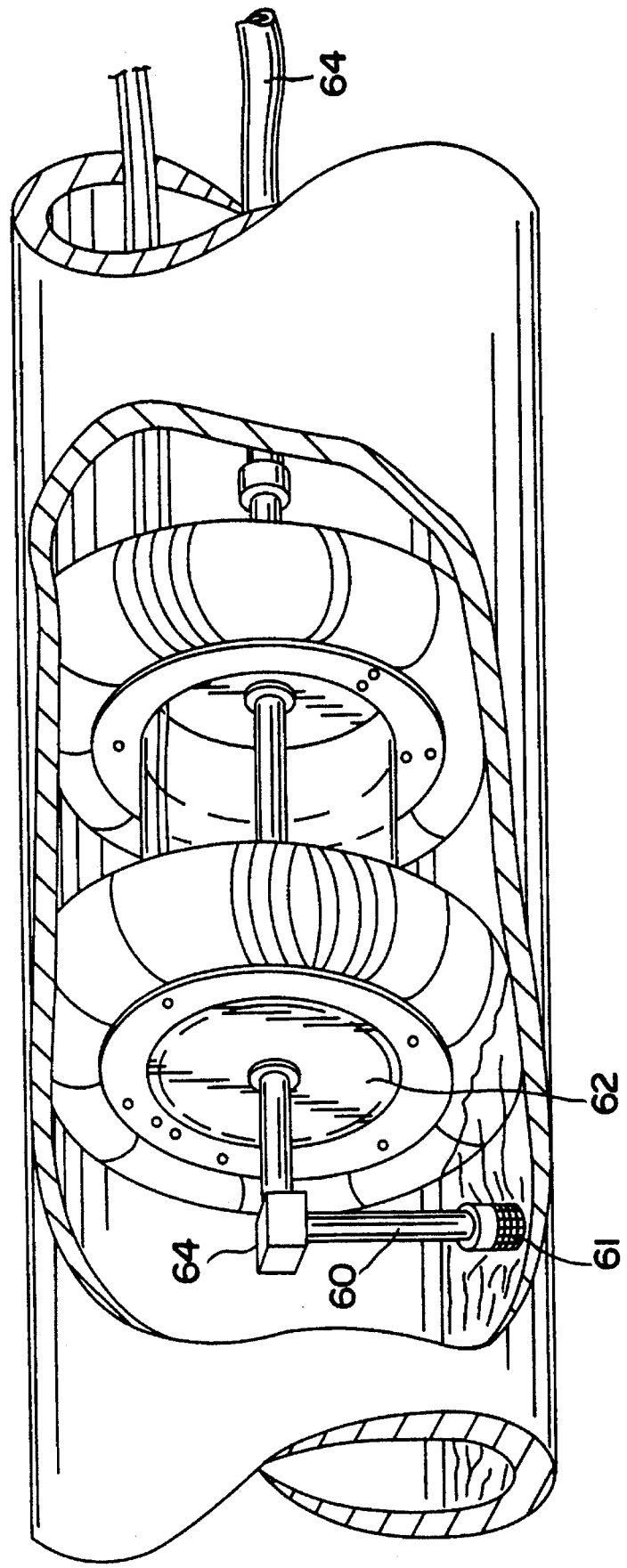
FIG. 7 is a drawing illustrating a modification permitting isolation of the weld zone and drainage of liquid from adjacent portion of the pipe structure.

In many repair applications it is not always convenient to totally isolate the weld zone from the system utilizing the pipe. In such a situation liquid from the process may accumulate in the weld zone. The apparatus comprising the invention may be modified as illustrated in FIG. 7 to permit an accumulation of such liquids.

More specifically a drain tube 60 is mounted to extend through the upstream hub 62. A rotating coupling 64 assures that the nozzle 66 points downward due to gravity liquid accumulating in the pipe and is removed through an exhaust tube 64. Additionally, the apparatus may be used to provide a cooling atmosphere, such as water at the interior of the pipe.

We claim:

1. An apparatus for aiding in welding a pipe structure, comprising in combination:
    a) first and second expandable spaced apart seals adapted to be positioned in said pipe structure and on opposed sides of a region subjected to a welding process, each of said spaced apart seals having a circular exterior surface selectively expandable to contact and form a seal with an interior surface of said piping structure, and a circular inner surface;
    b) a light-transmitting tubular shield support extending between said first and second seals and mating with said circular inner surfaces to position said first and said second seals in spaced relationship with each other;
    c) an optical assembly having a selectable field of view and supported within an interior of said tubular shield support and rotatable about a major axis of said tubular shield support for producing an image of a portion of said inner surface of said piping structure that is within the field of view of said optical assembly; and
    d) fluid supply means for supplying a pumpable fluid to a region between an exterior surface of said tubular shield support and the interior of said pipe structure, and between said first and second seals, and said light-transmitting shield support providing a protective barrier between said fluid and said optical assembly for shielding said optical assembly from said fluid.

2. An apparatus according to claim 1, wherein said optical assembly includes a light for illuminating the interior of said piping structure.

3. An apparatus according to claim 1, wherein said pumpable fluid comprises water having a flow rate sufficient to maintain the interior surface of said piping structure between said first and second seals at a preselected temperature.

4. An apparatus according to claim 1, wherein said pumpable fluid comprises a gas having a flow rate sufficient to maintain the interior surface of said piping structure between said first and second seals at a preselected temperature.

5. An apparatus according to claim 1, and comprising a drainage tube extending axially through said tubular shield support from an entrance point outside of said first seal to an exhaust point outside of said second seal, whereby fluid is transferred from a first exterior region adjacent to said first seal and through said tubular shield support to a second exterior region adjacent to said second seal without contacting said optical assembly.

6. An apparatus according to claim 1, wherein said optical assembly comprises a television camera.

7. An apparatus according to claim 2, wherein said optical assembly includes an adjustable mirror for being manipulated by an operator, and cooperating with the television camera to permit viewing of a selected portion of the interior of said piping structure.

* * * * *